United States Patent
Oren et al.

(10) Patent No.: US 10,883,370 B2
(45) Date of Patent: Jan. 5, 2021

(54) DOVETAIL WEIGHT SYSTEM FOR ROTOR BALANCE

(71) Applicant: United Technologies Corporation, Farmington, CT (US)

(72) Inventors: Nicholas Waters Oren, Marlborough, CT (US); Ross Wilson, South Glastonbury, CT (US)

(73) Assignee: RAYTHEON TECHNOLOGIES CORPORATION, Waltham, MA (US)

(*) Notice: Subject to any disclaimer, the term of this patent is extended or adjusted under 35 U.S.C. 154(b) by 128 days.

(21) Appl. No.: 16/103,138

(22) Filed: Aug. 14, 2018

(65) Prior Publication Data

US 2020/0056482 A1    Feb. 20, 2020

(51) Int. Cl.
*F01D 5/02* (2006.01)
*F01D 5/30* (2006.01)

(52) U.S. Cl.
CPC .......... *F01D 5/027* (2013.01); *F01D 5/3007* (2013.01); *F05D 2260/15* (2013.01)

(58) Field of Classification Search
CPC ...... F01D 5/027; F01D 5/3007; F01D 5/3015; F05D 2260/15
See application file for complete search history.

(56) References Cited

U.S. PATENT DOCUMENTS

| | | | |
|---|---|---|---|
| 3,888,601 A * | 6/1975 | Glassburn | F01D 5/027 416/144 |
| 4,477,226 A * | 10/1984 | Carreno | F01D 5/027 416/144 |
| 4,480,957 A * | 11/1984 | Patel | F01D 5/16 416/220 R |
| 4,648,799 A * | 3/1987 | Brown | F01D 5/3015 416/220 R |
| 4,803,893 A | 2/1989 | Bachinski | |
| 4,898,514 A * | 2/1990 | McCracken | F01D 5/027 416/144 |

(Continued)

FOREIGN PATENT DOCUMENTS

FR    2358545 A1    2/1978

OTHER PUBLICATIONS

European Search Report for European Application No. 19180400.1-1004, dated Feb. 13, 2020, 9 pages.

*Primary Examiner* — Igor Kershteyn
(74) *Attorney, Agent, or Firm* — Cantor Colburn LLP

(57) ABSTRACT

A balancing assembly for a rotating component of a gas turbine engine includes a balance weight configured for insertion into a complimentary balance weight slot in the rotating component. The balance weight has a dovetail shaped cross-section and the balance weight slot has a complimentary dovetail shaped cross-section. A retaining ring configured for installation to the rotating component axially retains the balance weight in the balance weight slot. A method of correcting an imbalance of a rotating assembly includes inserting a balance weight into a balance weight slot in a rotating component of the rotating assembly, and installing a retaining ring at the rotating component to retain the balance weight in the balance weight slot in an axial direction. The balance weight has a dovetail shaped cross section, and the balance weight slot has a complimentary dovetail shaped cross section to retain the balance weight at the balance weight slot.

17 Claims, 4 Drawing Sheets

(56) References Cited

U.S. PATENT DOCUMENTS

| | | | |
|---|---|---|---|
| 5,018,943 A * | 5/1991 | Corsmeier | F01D 5/027 |
| | | | 416/144 |
| 6,481,969 B2 | 11/2002 | Berry et al. | |
| 7,347,672 B2 | 3/2008 | Bertrand et al. | |
| 8,177,487 B2 * | 5/2012 | Koza | F01D 5/027 |
| | | | 415/119 |
| 8,246,305 B2 | 8/2012 | Lecuyer et al. | |
| 8,727,735 B2 * | 5/2014 | Lee | F01D 5/3015 |
| | | | 416/220 R |
| 9,127,563 B2 * | 9/2015 | Dimmick, III | F01D 5/027 |
| 9,260,977 B2 * | 2/2016 | Milner | F16F 15/34 |

\* cited by examiner

DOVETAIL WEIGHT SYSTEM FOR ROTOR BALANCE

STATEMENT OF FEDERAL SUPPORT

This invention was made with Government support awarded by the United States. The Government has certain rights in the invention.

BACKGROUND

Exemplary embodiments of the present disclosure pertain to the art of gas turbine engines, and in particular to the balancing of rotating components of gas turbine engines.

Gas turbine engines include several rotating components such as rotor disks, cover plates, and the like. The rotating components and assemblies of rotating components, also referred to as modules, typical have requirements for balance about their axis of rotation. For component balance, material removal is often used to achieve requirements. At the assembly stage, however, space and foreign object damage considerations make material removal a less viable option to achieve assembly balance. As such, features are utilized that allow for localized weights to be removed or installed easily from the assembly. Typical configurations include counterweights that are riveted onto component flanges, balance rings, or weights that are installed via set screws. Such configurations, however, typically require special tooling such as a rivet flaring tool for installation of the weights, and the assembly must have space provisions to allow for use of the tool in the selected balance area. Such methods also make removal of balance weights difficult as well.

BRIEF DESCRIPTION

In one embodiment, a balancing assembly for a rotating component of a gas turbine engine includes a balance weight configured for insertion into a complimentary balance weight slot in the rotating component. The balance weight has a dovetail shaped cross-section and the balance weight slot has a complimentary dovetail shaped cross-section. A retaining ring configured for installation to the rotating component axially retains the balance weight in the balance weight slot.

Additionally or alternatively, in this or other embodiments the dovetail-shaped cross section of the balance weight retains the balance weight in the balance weight slot in a radial direction relative to an axis of rotation of the rotating component.

Additionally or alternatively, in this or other embodiments the retaining ring is formed from a metal material.

Additionally or alternatively, in this or other embodiments the balance weight includes one or more grooves or scallops formed therein.

Additionally or alternatively, in this or other embodiments the retaining ring is configured for installation in a weight groove of the rotating component, extending circumferentially about the rotating component.

Additionally or alternatively, in this or other embodiments the balance weight slot extends axially along a radially inner surface of the rotating component.

In another embodiment, a rotating assembly of a gas turbine engine includes one or more rotating components including one or more balancing slots, and a balancing assembly located at a balancing slot of the one or more balancing slots. The balancing assembly includes a balance weight inserted into the balance weight slot, the balance weight having a dovetail shaped cross-section and the balance weight slot having a complimentary dovetail shaped cross-section. A retaining ring is installed to the rotating component to axially retain the balance weight in the balance weight slot.

Additionally or alternatively, in this or other embodiments the dovetail-shaped cross section of the balance weight retains the balance weight in the balance weight slot in a radial direction relative to an axis of rotation of the rotating component.

Additionally or alternatively, in this or other embodiments the retaining ring is formed from a metal material.

Additionally or alternatively, in this or other embodiments the balance weight includes one or more grooves or scallops.

Additionally or alternatively, in this or other embodiments the retaining ring is configured for installation in a weight groove of the rotating component, extending circumferentially about the rotating component.

Additionally or alternatively, in this or other embodiments the balance weight slot extends axially along a radially inner surface of the rotating component.

In yet another embodiment, a method of correcting an imbalance of a rotating assembly includes inserting a balance weight into a balance weight slot in a rotating component of the rotating assembly, and installing a retaining ring at the rotating component to retain the balance weight in the balance weight slot in an axial direction. The balance weight has a dovetail shaped cross section, and the balance weight slot has a complimentary dovetail shaped cross section to retain the balance weight at the balance weight slot in a radial direction.

Additionally or alternatively, in this or other embodiments the retaining ring is formed from a metal material.

Additionally or alternatively, in this or other embodiments one or more grooves or scallops are located in the balance weight.

Additionally or alternatively, in this or other embodiments the retaining ring is installed in a weight groove of the rotating component, extending circumferentially about the rotating component.

Additionally or alternatively, in this or other embodiments the balance weight slot extends axially along a radially inner surface of the rotating component.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
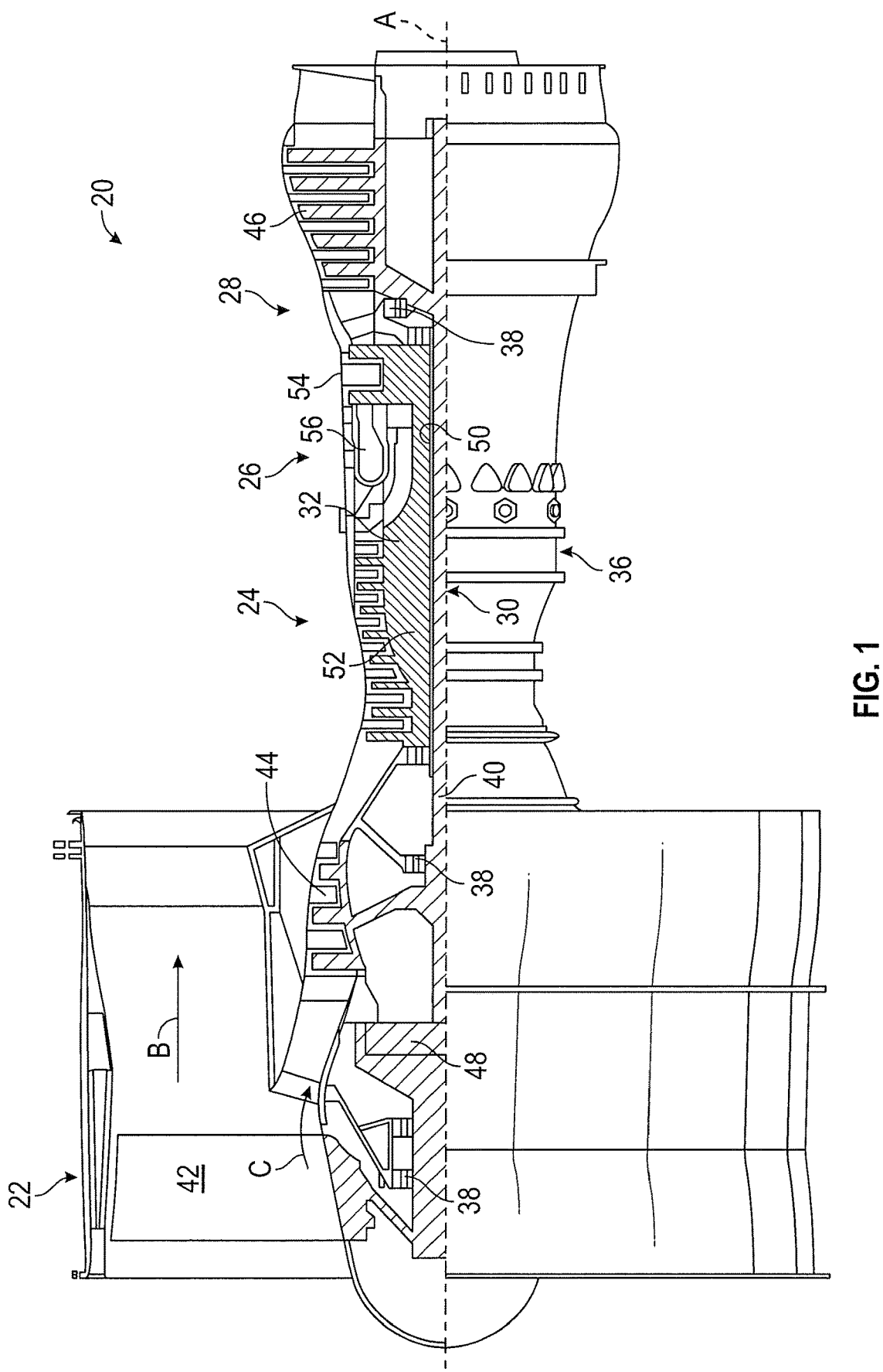
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
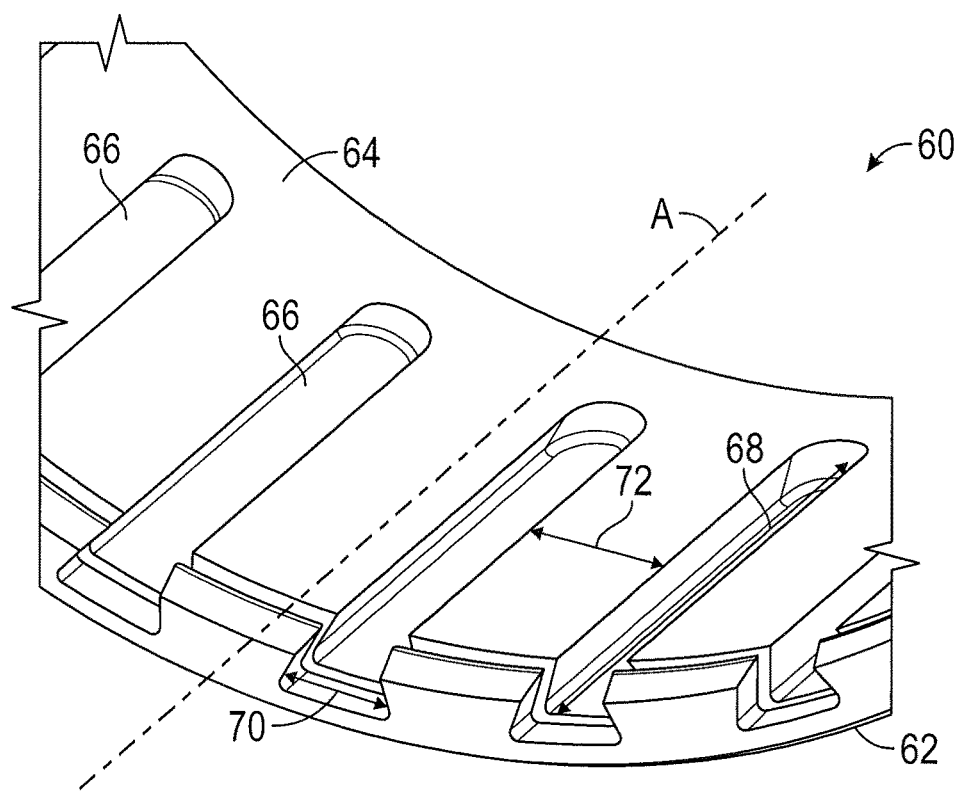
FIG. 2 is a partial perspective view of an embodiment of a rotating component of a gas turbine engine.

Referring now to FIG. 2, a partial view of a rotating component 60 of the gas cross-sectional view of the gas turbine engine 20 is illustrated. The rotating component 60 is, for example, the inner shaft 40, the outer shaft 50, or a hub or rotor of one of the high pressure turbine 54, low pressure turbine 46, or of the fan section 22 or compressor section 24. The rotating component 60 is located at and rotates about the engine central longitudinal axis A. The rotating component 60 includes a radially outer surface 62, which may define a portion of the gas flowpath of the gas turbine engine 20, and a radially inner surface 64.

A plurality of balance weight slots 66 are formed in the radially inner surface 64 of the rotating component 60, and extend axially along the radially inner surface 64. The plurality of balance weight slots 66 have an axial length 68 and a circumferential width 70, and may be equally spaced around the radially inner surface 64 by a slot spacing 72.

Figure 3:
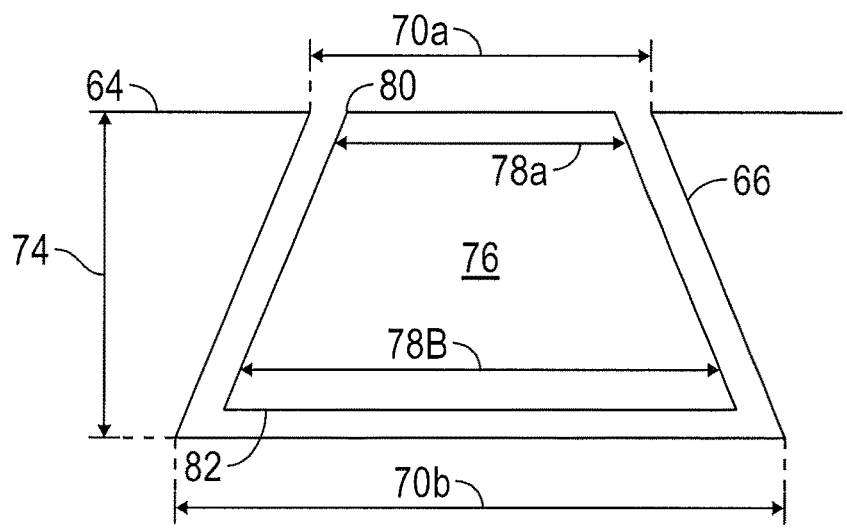
FIG. 3 is a cross-sectional view of an embodiment of a balancing weight opening in the rotating component.
Figure 4:
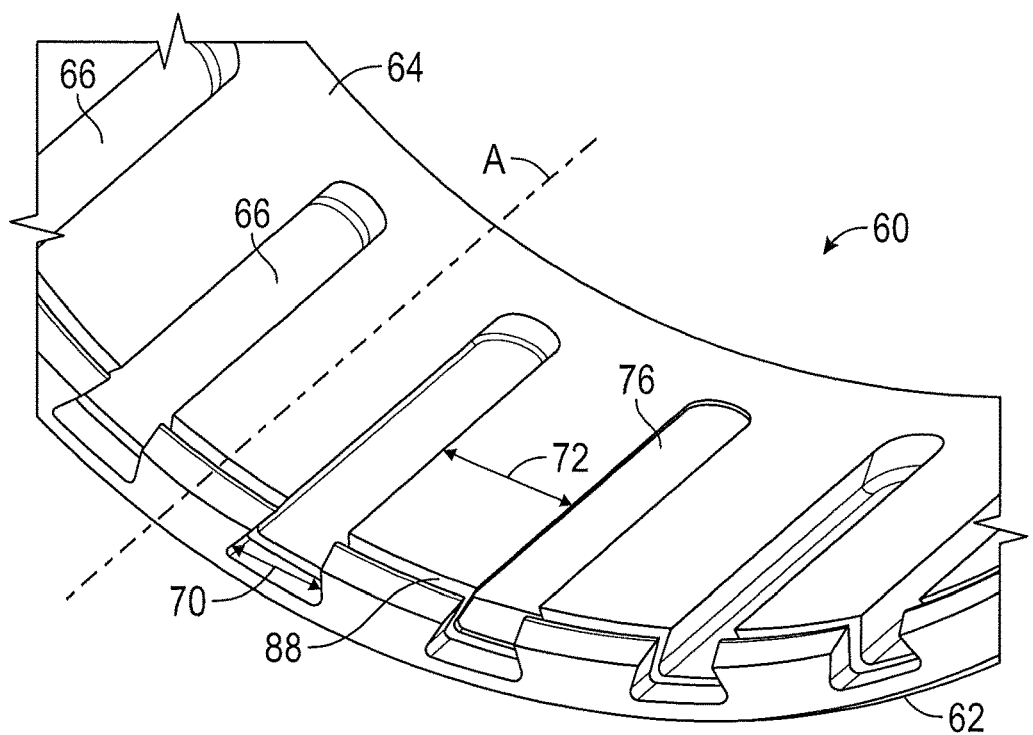
FIG. 4 is a partial perspective view of an embodiment of a rotating component having a balance weight installed.

Referring now to FIG. 3, a cross-sectional view of an embodiment of a balance weight slot 66 is illustrated. The balance weight slot 66 has radial slot depth 74 and is a dovetail shape, in which a first circumferential width 70a at the radially inner surface 64 is less than a second circumferential width 70b at the radial slot depth 74. As shown in FIG. 3 and FIG. 4, a complementary balance weight 76 is inserted into one or more of the balance weight slots 66. The balance weight 76 also has a dovetail shape, in which a first balance weight width 78a at a radially inboard weight surface 80 is less than a second balance weight width 78b at a radially outboard weight surface 82. The dovetail shape of the balance weight slot 66 and the balance weight 76 retain the balance weights 76 radially at the balance weight slots 66.

Figure 5:
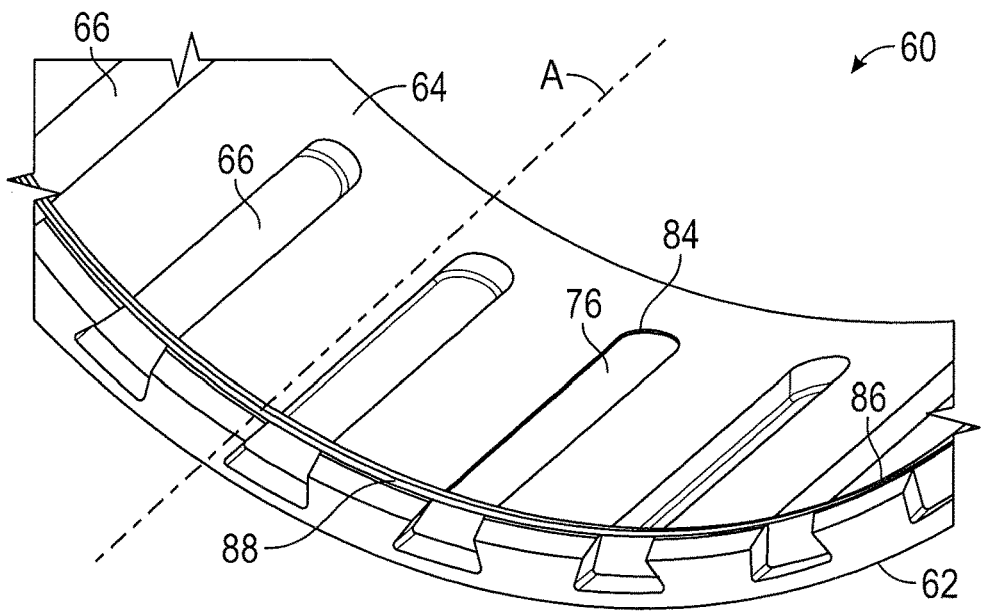
FIG. 5 is a partial perspective view of an embodiment of a rotating component having a retaining ring to retain the balancing weight at the rotating component.

Referring to FIG. 5, the balance weights 76 are axially retained in the balance weight slots 66 at a first end by a slot wall 84. The balance weights 76 are axially retained at a second end by a retaining ring 86 installed in a ring groove 88, which extends circumferentially around the rotating component 60 at the radially inner surface 64. In some embodiments, the retaining ring 86 is formed from, for example, a metallic material.

Placement of the balance weights 76 at selected balance weight slots 66 of the rotating component 60 corrects an imbalance of the rotating component 60. Further, the configurations of individual balance weights 76 may be varied to aid in tuning of the rotating component 60 balance. For example, balance weights 76 at different balance weight slots 66 may be formed from different materials, such that the balance weight 76 masses differ.

Figure 6:
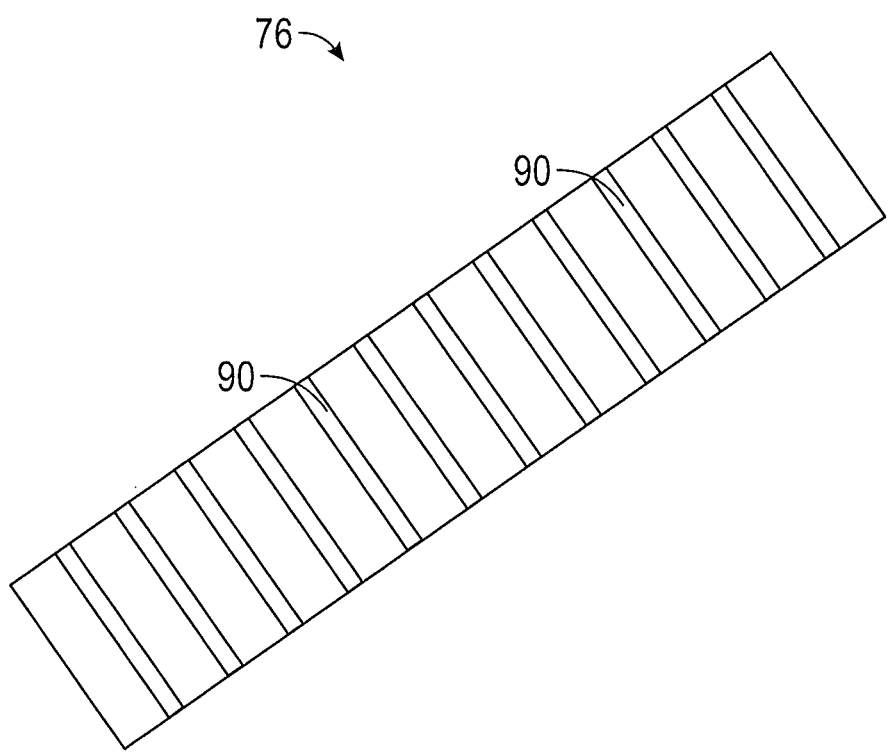
FIG. 6 is a perspective view of an embodiment of a balance weight.

Further, as shown in FIG. 6, the balance weight 76 may include weight grooves 90 to reduce the mass of the balance weight 76 compared to a balance weight 76 without weight grooves 90. In the embodiment of FIG. 6, the weight grooves 90 extend circumferentially about the balance weight 76. In other embodiments, however, the weight grooves 90 may extend, for example, axially along the balance weight 76. Further, other modifications to the shape of the balance weight 76 may be utilized to reduce the mass of the balance weight 76. Such modifications may include, for example, scallops, holes or the like.

The balance weight 76 and balance weight slot 66 arrangements disclosed herein provide an easy and relatively quick to install and remove solution to correct rotating component or assembly imbalance. Further, no special tools, such as a rivet flaring tool, are required for installation. Additionally, the arrangement may be used in relatively small spaces that solutions requiring special tools cannot be used. Further, the balance weight 76 and balance weight slot 66 are simple and easily manufactured.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A balancing assembly for a rotating component of a gas turbine engine, comprising:
   a balance weight configured for insertion into a complimentary balance weight slot in the rotating component, the balance weight having a dovetail shaped cross-section and the balance weight slot having a complimentary dovetail shaped cross-section, the balance weight slot having:
      a radial slot depth;
      a first circumferential slot width at a radially inner surface of the component; and
      a second circumferential slot width at the slot depth, the second circumferential slot width greater than the first circumferential slot width; and
   a retaining ring configured for installation to the rotating component to axially retain the balance weight in the balance weight slot.

2. The balancing assembly of claim 1, wherein the dovetail-shaped cross section of the balance weight retains the balance weight in the balance weight slot in a radial direction relative to an axis of rotation of the rotating component.

3. The balancing assembly of claim 1, wherein the retaining ring is formed from a metal material.

4. The balancing assembly of claim 1, further comprising one or more grooves or scallops in the balance weight.

5. The balancing assembly of claim 1, wherein the retaining ring is configured for installation in a weight groove of the rotating component, extending circumferentially about the rotating component.

6. The balancing assembly of claim 1, wherein the balance weight slot extends axially along a radially inner surface of the rotating component.

7. A rotating assembly of a gas turbine engine, comprising:
   one or more rotating components including one or more balancing slots; and
   a balancing assembly disposed at a balancing slot of the one or more balancing slots, including:
      a balance weight inserted into the balance weight slot, the balance weight having a dovetail shaped cross-section and the balance weight slot having a complimentary dovetail shaped cross-section, the balance weight slot having:
         a radial slot depth;
         a first circumferential slot width at a radially inner surface of the component; and
         a second circumferential slot width at the slot depth, the second circumferential slot width greater than the first circumferential slot width; and
      a retaining ring installed to the rotating component to axially retain the balance weight in the balance weight slot.

8. The rotating assembly of claim 7, wherein the dovetail-shaped cross section of the balance weight retains the balance weight in the balance weight slot in a radial direction relative to an axis of rotation of the rotating component.

9. The rotating assembly of claim 7, wherein the retaining ring is formed from a metal material.

10. The rotating assembly of claim 7, further comprising one or more grooves or scallops in the balance weight.

11. The rotating assembly of claim 7, wherein the retaining ring is configured for installation in a weight groove of the rotating component, extending circumferentially about the rotating component.

12. The rotating assembly of claim 7, wherein the balance weight slot extends axially along a radially inner surface of the rotating component.

13. A method of correcting an imbalance of a rotating assembly, comprising:
   inserting a balance weight into a balance weight slot in a rotating component of the rotating assembly; and installing a retaining ring at the rotating component to retain the balance weight in the balance weight slot in an axial direction;

wherein the balance weight has a dovetail shaped cross section, and the balance weight slot has a complimentary dovetail shaped cross section to retain the balance weight at the balance weight slot in a radial direction, the balance weight slot having:
  a radial slot depth;
  a first circumferential slot width at a radially inner surface of the component; and
  a second circumferential slot width at the slot depth, the second circumferential slot width greater than the first circumferential slot width.

14. The method of claim 13, wherein the retaining ring is formed from a metal material.

15. The method of claim 13, further comprising one or more grooves or scallops in the balance weight.

16. The method of claim 13, wherein the retaining ring is installed in a weight groove of the rotating component, extending circumferentially about the rotating component.

17. The method of claim 13, wherein the balance weight slot extends axially along a radially inner surface of the rotating component.

* * * * *